United States Patent [19]

Shackelford et al.

[11] 3,891,097
[45] June 24, 1975

[54] CHICKEN COOP UNSTACKING MACHINE

[75] Inventors: Albert D. Shackelford, Athens; John H. Holladay, Winterville; E. J. Lloyd, Athens, all of Ga.

[73] Assignee: The United States of America as represented by the Secretary of Agriculture, Washington, D.C.

[22] Filed: July 6, 1973

[21] Appl. No.: 376,973

[52] U.S. Cl............................ 214/8.5 H; 214/8.5 A
[51] Int. Cl............................................ B65g 59/02
[58] Field of Search........... 214/8.5 R, 8.5 A, 8.5 H, 214/306

[56] References Cited
UNITED STATES PATENTS

| | | | |
|---|---|---|---|
| 2,161,836 | 6/1939 | Stevenson | 214/8.5 A |
| 2,258,461 | 10/1941 | Marsden et al. | 214/8.5 A |
| 2,517,956 | 8/1950 | Albertoli | 214/306 |
| 3,101,851 | 8/1963 | Heide et al. | 214/8.5 R |

*Primary Examiner*—Robert J. Spar
*Assistant Examiner*—Gary Auton
*Attorney, Agent, or Firm*—M. Howard Silverstein; Max D. Hensley

[57] ABSTRACT

An apparatus and process for receiving tiered stacks of chicken coops at an unloading area, conveying a tier at a time, and unstacking the tier onto distribution systems within a poultry processing plant without causing damage to the live poultry. With slight modifications the apparatus can be utilized for unstacking other tiered materials.

2 Claims, 5 Drawing Figures

CHICKEN COOP UNSTACKING MACHINE

A non-exclusive, irrevocable, royalty-free license in the invention herein described throughout the world for all purposes of the United States Government, with the power to grant sublicenses for such purposes, is hereby granted to the Government of the United States of America.

This invention relates to an apparatus and process for mechanically handling stacks of chicken coops. Particularly, this invention relates to an apparatus and process for conveying stacks of chicken coops into a tower where they are elevated and dispersed one coop at a time from the top of the stack onto other systems and conveyed into a poultry processing plant. The chicken coops are made ready for removing the chickens therefrom more expeditiously by the use of the apparatus and process of this invention.

The main object of the instant invention is to provide the poultry industry with a more practical and efficient means of unloading and dispensing coops of chickens into the processing plant.

A second objective of the instant invention is to provide the poultry industry with the means of handling coops of chickens without damaging the poultry carcasses or the coops in which they are confined.

In unloading live chickens from trucks and dispensing them into the processing plant, it has been the custom to manually remove the coops which weigh approximately 75 pounds and toss them onto conveyors which move them into the processing plant.

Now we have invented an apparatus for alleviating the problem of high labor input and damage to the chicken and chicken coops when coops of chickens are being unloaded from trucks and moved into the processing plant. The apparatus of the instant invention will convey, elevate, and unstack poultry coops, which are generally manufactured from wood or synthetic materials.

The mechanical apparatus of this invention, though designed for conveying, elevating, and dispensing coops of poultry, is useful in other unstacking operations and can best be described by the component parts of which are assembled to operate in combination and comprising:

a. a combination of roller conveyors for moving stacks of poultry coops into the device with limit switches to allow only one stack at a time to enter the unstacking tower b. a platform attached to a ball bearing screw (jackscrew) for elevating the stacks of coops c. spring-loaded powered chains or belts for expelling coops out of the tower d. four coop discharge wheels for assisting in discharging of coops from the device e. a coop discharge conveyor for conveying the coops in single file into the processing plant f. the necessary framework for containing the device and the necessary motors, drives, etc. for powering the devices within the instant invention.

To illustrate the preferred embodiment of the instant invention, five drawings are provided. However, these illustrations are not meant to limit the invention in any manner.

Figure 1:
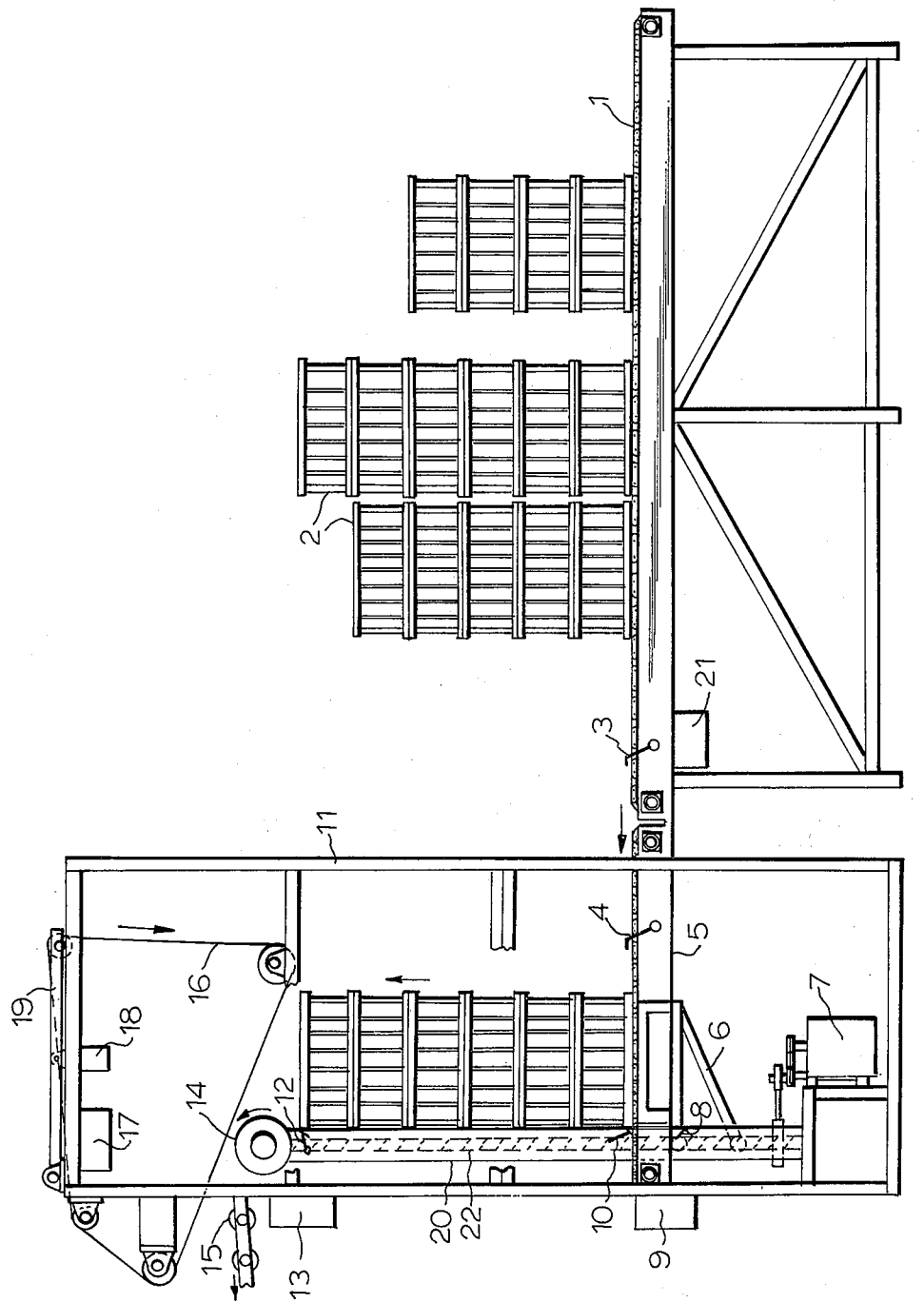
FIG. 1 is a side elevation of the chicken coop unstacking machine.
Figure 2:
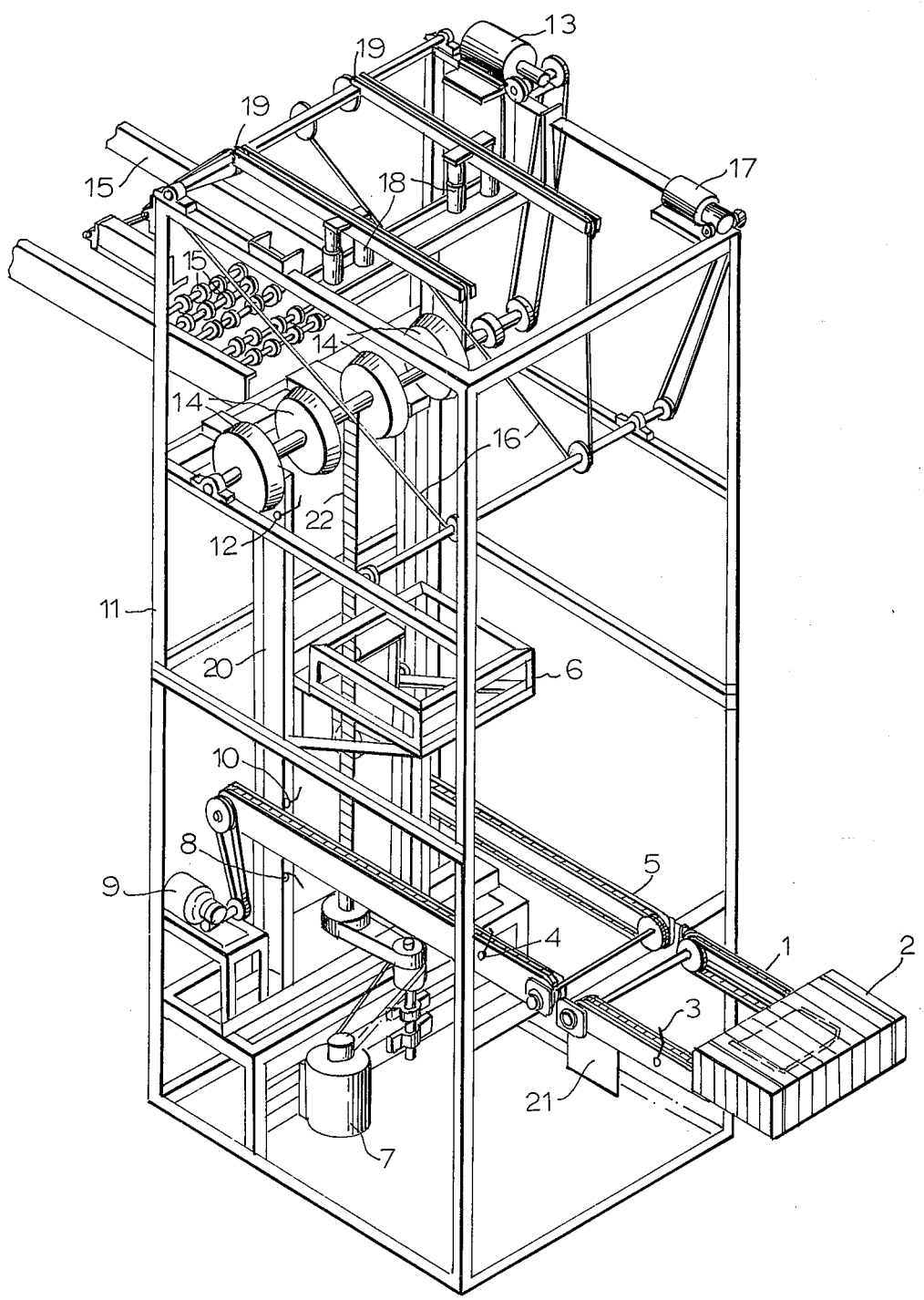
FIG. 2 is an isometric view of the apparatus.

Now referring to FIG. 1, the machine operates in the following manner:

Tiers of chicken coops of varying heights, up to the height the machine was designed to handle, are stacked on conveyor 1 from the truck bringing chickens to the processing plant. The tiers of coops in single file are conveyed along conveyor and onto conveyor 5 until limit switch 4 is activated, limit switch 4 stops conveyor 1 which separates a stack of coops from the tier and allows conveyor 5 to move the stack of coops in position on the lift platform. When the stack of coops contact limit switch 10, the screw drive unit 7 is energized. The entire tier is elevated on lift platform 6; and as the tier rises to the topmost position of the tower, the top coop engages powered spring loaded chains or belts 16 and coop discharge wheels 14 which in combination exert a horizontal force on the topmost coop, thus expelling the coop from the machine onto coop discharge conveyor 15. To be more specific and referring to FIG. 2, coops entering the device along conveyor 1 encounters limit switches 3 which controls the operation of conveyor 1 only when the lift platform is not in contact with limit switch 8. As the coops encounter switch 4, this provides for holding a stack of coops ready to enter the unstacking device while another stack is being unstacked. At the proper time, another stack enters the device automatically and without manual assistance or manual pressing of switches.

When a stack of coops enter the unstacking tower, platform 6 is at its lowest position and slightly below the level of conveyor 5. A stack of coops is conveyed along conveyor 5 and activates limit switch 10, which activates platform 6.

Figure 3:
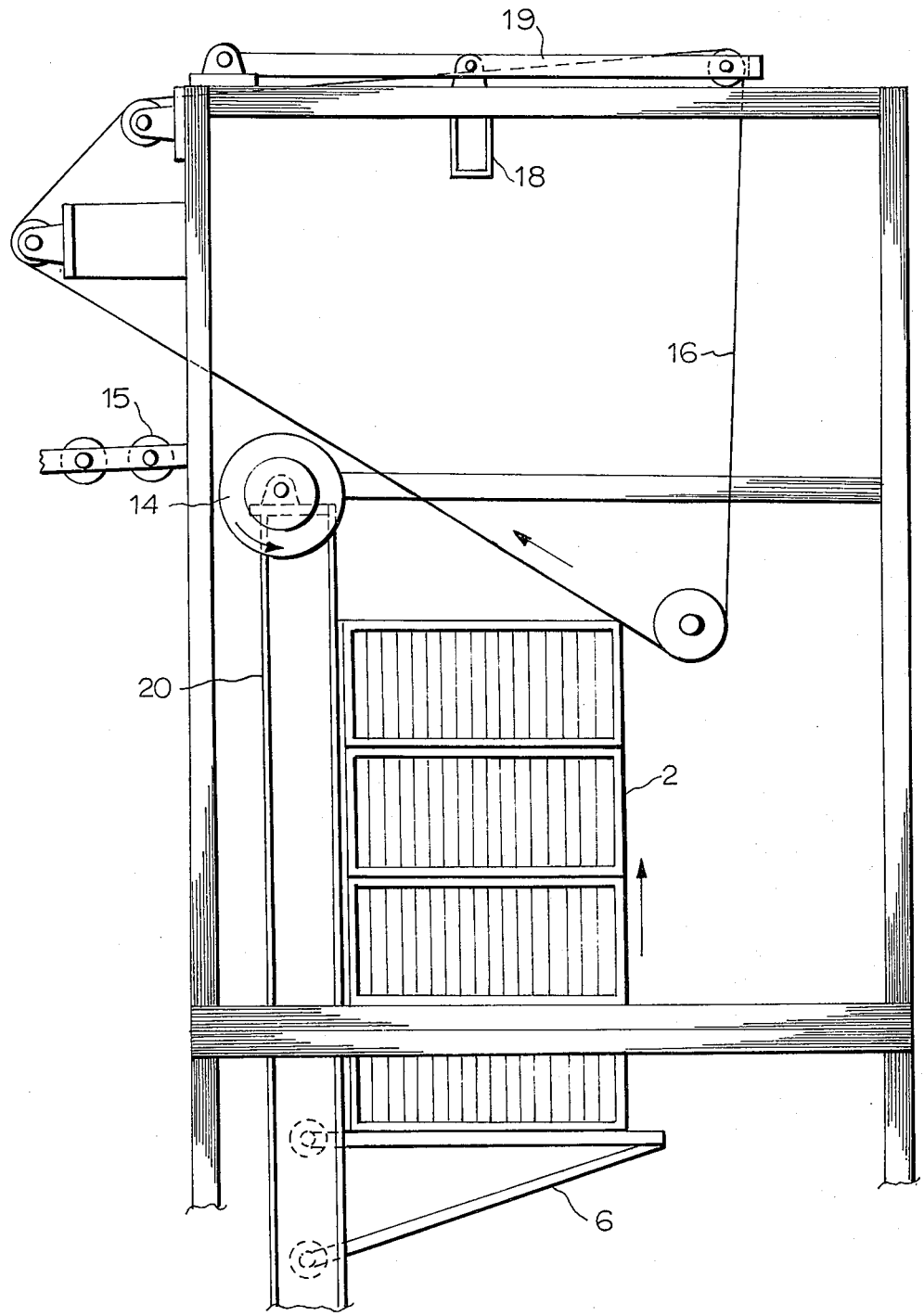
FIG. 3 is a fragmentary view of a side elevation of an enlarged view of the upper portion of the machine.
Figure 4:
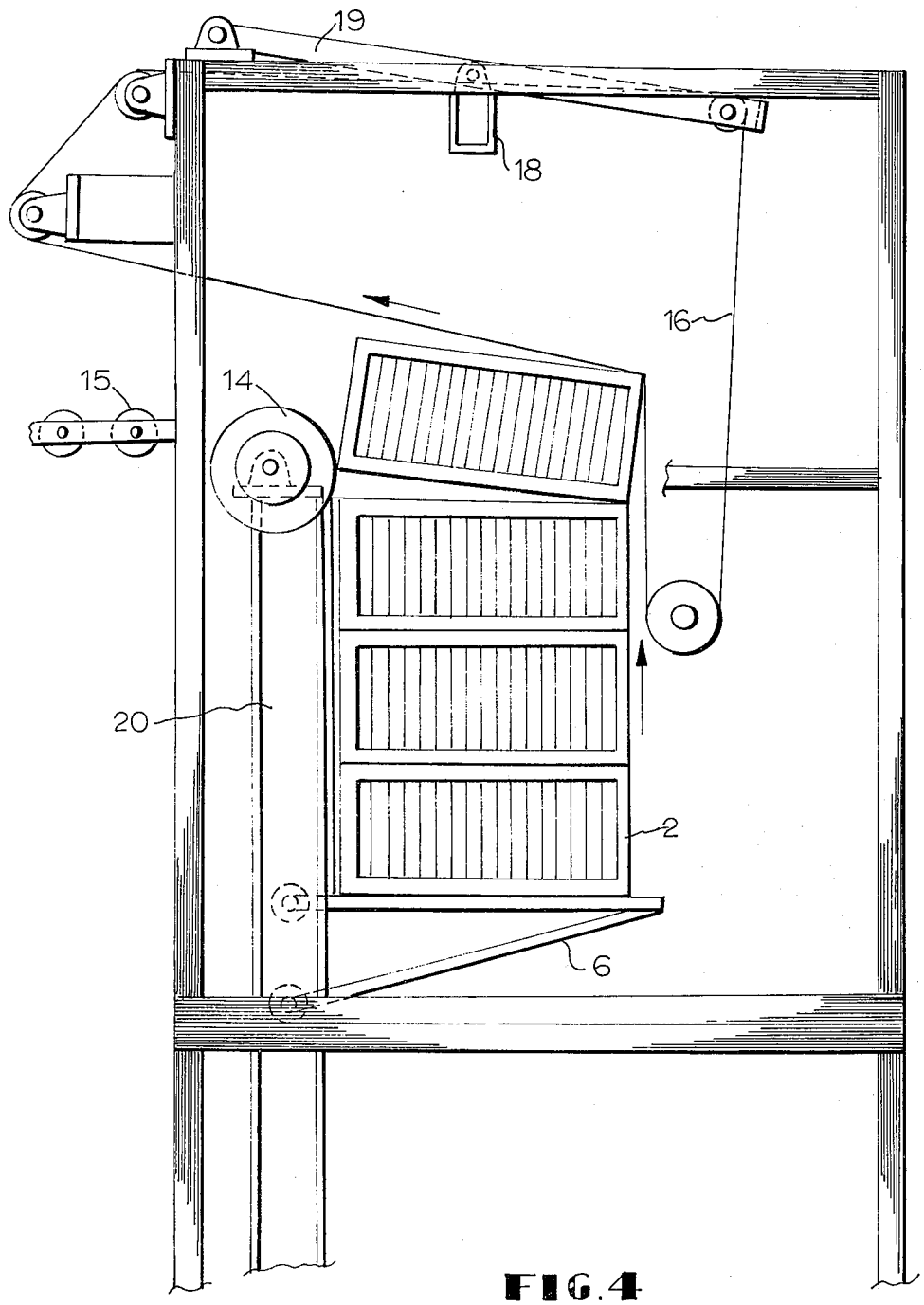
FIG. 4 is an elevation of the upper portion of the machine which is about to discharge un stacked coop from the top of the stack.
Figure 5:
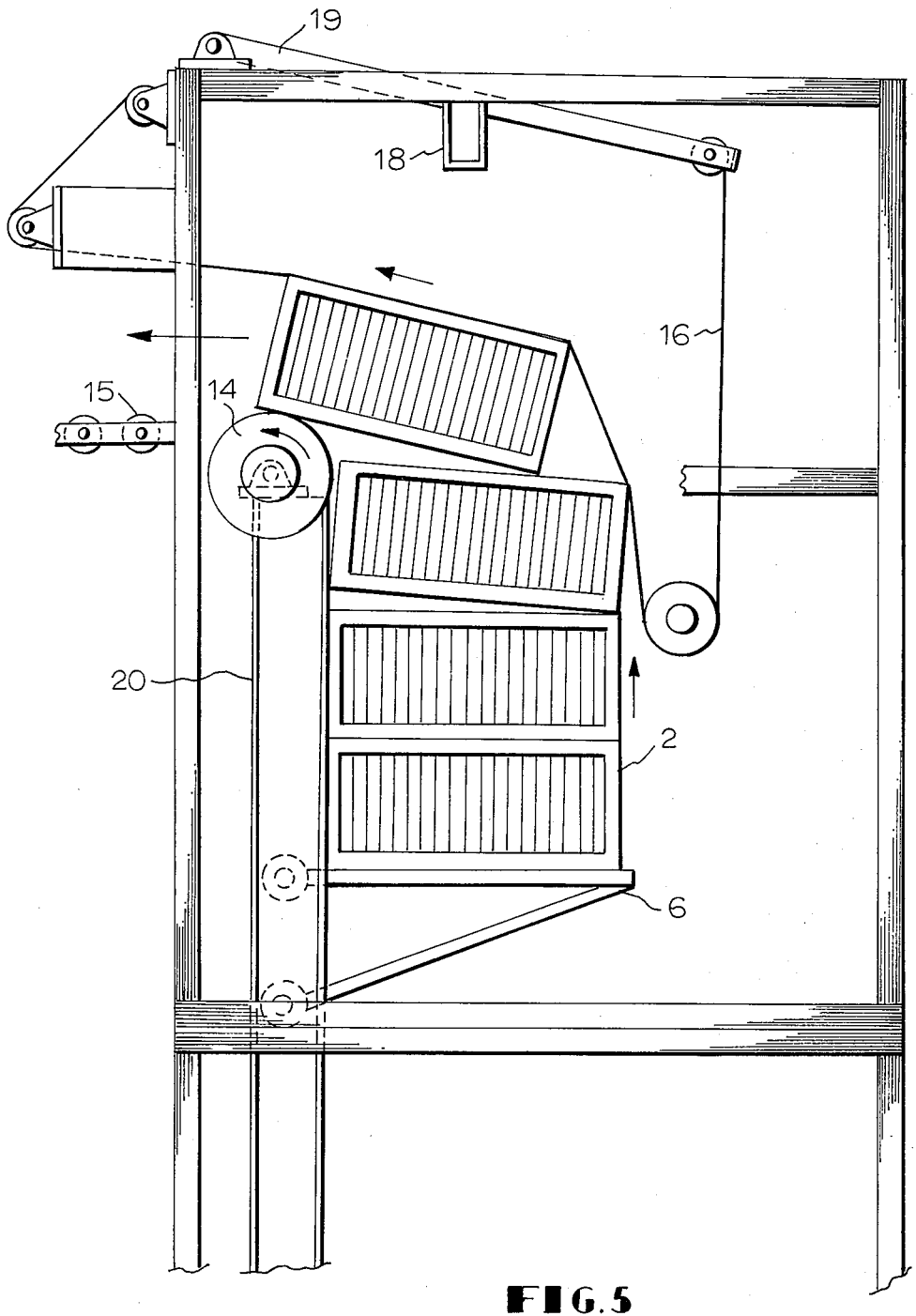
FIG. 5 is a side view of the upper portion of the machine showing the coop being discharged from the unstacked device.

As limit switch 10 is activated, platform 6 raises the stack of coops until the top coop encounters the powered-spring loaded chains or belts 16 and coop discharge wheels 14. Tension is put on the powered-spring loaded chain or belt by powered-chained tension device 18, which encloses a tension spring. Wheels 14 are rotating counter-clockwise from the left side of the apparatus and tend to lift the top coop away from the stack as the stack continues to rise. The tension on the powered-spring loaded chains or belts imposes a horizontal thrust forward from the unstacking device onto conveyor 15, which conveys the coop into the processing plant. The previous sequence of events in the unstacking operations are illustrated in FIGS. 3, 4, and 5.

When the last coop on platform 6 is thrust from the unstacking tower, limit switch 12 is activated by platform 6. This reverses the screw shaft and platform 6 returns to its lowest position for reloading another stack of coops. Once it has reached this position, it strikes limit switch 8, which activates limit switches 3 and 4 and allows another stack of coops to enter the unstacking tower.

Once the stacks of coops are placed on conveyor 1, the stacks are handled mechanically into the unstacking tower and the coops unstacked and gently conveyed into the processing plant without manual effort.

This apparatus eliminates the toilsome lobor usually performed in a dusty atmosphere and prevents damage to chicken coops and to the chickens within the coops during the unloading and receiving operations.

Some novel features of this device are as follows:

1. A series of limit switches which allows a stack of chicken coops to be held in readiness while a previous stack is being unstacked by the device and which automatically conveys the second stack into place immediately when the machine is ready to receive another stack, thus increasing the productivity of the operation over other means of handling coops.

2. A platform 6, which is mounted on a large nut that is routed vertically up and down on a ball bearing screw (jackscrew) 22 in rapid movement, which is turned by a motor and belt assembly 7.

3. A series of four rubber-tired wheels 14 which are powered and tend to de-nest the top coop from the stack and to boost it from the machine once it clears the top of the wheel.

4. Novel spring-loaded chain or belt drives 16 which are allowed to flex upward when the top coop strikes them by means of the powered chain or belt tension devices 18. This is effected by depression of tension springs within the powered chain or belt tension devices.

5. A control system which synchronizes the movement of all parts and provides continuous operation of the unstacking apparatus as long as coops are kept supplied to conveyor 1.

ADDENDA:

This apparatus can be employed for handling a wide variety of rectangular solids which might require gentle unstacking onto conveyor belts or other transportation devices.

We claim:

1. An apparatus for transporting tiered rectangular solids from external to internal areas of warehousing or processing plants therein to unstack each transported tier, the apparatus comprising a tower structure for providing support and rigidity to all components and containing a first and a second horizontal feed conveyor which support and convey a stack-at-a-time of reactangular solids; a plurality of limit switches to provide limit control to each stack as it is being transported horizontally and vertically; a lift platform, driven vertically by a vertically positioned ball bearing screw (jackscrew), the function of which platform being to lift a stack to a predetermined elevation therein to discharge the top rectangular solid from the top of each stack horizontally upon making contact with a plurality of moving springloaded endless conveyor elements; a plurality of springloaded endless conveyor elements which yield slightly to the upward force of the elevating stack of rectangular solids thereby providing the time-lapse and yielding quality required for overcoming the inertia of the topmost rectangular solid; the said endless conveyor elements being located near the top of the tower support structure and providing the force required to expel each solid as it comes in contact with and under the endless conveyor elements a plurality of discharge wheels the laterial traveling movement of said endless conveyor elements assisted in the expelling of the topmost rectangular solid by the complementing rotational movement of said plurality of discharge wheels onto and over which each rectangular solid is driven; and power means for energizing the forward, reverse, and repositioning motions of the conveyors, feed discharge wheels, the lift platform, endless conveyor elements, and said limit switches.

2. An apparatus for transporting tiered poultry coops containing live poultry from external to internal processing plants therein to unstack and disperse each coop onto other conveyance systems without destroying the life or limb of the poultry thus transported, the apparatus comprising these components assembled to operate synchronously:

a. a first feed conveyor which receives tiered stacks of poultry coops, for providing support and horizontal conveyance from an external transportation means to a plurality of stacks containing live poultry to transport from outside a processing plant to the inside of said processing plant wherein the tiered stacks are held in readiness, b. a plurality of limit switches which are actuated by the movement of the stacks on the first feed conveyor, the switches providing both a holding attitude and a "transport horizontally" attitude thereby permitting one stack to enter the unstacking operation while the succeeding stack is held in readiness, c. a second feed conveyor which provides support and horizontal conveyance to the stacks of coops fed to it by the first feed conveyor, d. a plurality of limit switches which are actuated by the movement of stacks into the second feed conveyor and out of it, thereby limiting the feeding of stacks to a one-stack-at-a-time attitude, e. a lift platform which provides upward vertical conveyance to each stack fed thereinto by the second feed conveyor, the vertical conveyance being rapid but avoiding destruction to life or limb of the cooped poultry, the lift platform being actuated by vertical limit switches which dictate the elevating, lowering, or arresting motions required, the lift platform being driven vertically upward or downward by a vertically positioned ball bearing screw (jackscrew) which elevates a stack of coops against a plurality of spring-loaded endless conveyor elements, f. a plurality of spring-loaded endless conveyor elements which yield slightly to the upward force of each coop as it becomes a top coop but only long enough for the endless conveyor elements to acquire enough force to overcome horizontal inertia and as the stack moves upward the endless conveyor elements moves the top coop horizontally toward a plurality of coop discharge wheels, g. a plurality of rubber encased coop discharge wheels which when energized turn synchronously with the spring loaded endless conveyor elements to complement the lateral expulsion of each coop as it is elevated to the topmost position, h. a tower support structure which provides support and rigidity to all components upon anchoring to a rigid floor structure, and i. power means for energizing all conveyors, limit switches, endless conveyor elements, discharge wheels, lift platform, ball bearing screw (jackscrew), and all related moving devices.

* * * * *